March 7, 1939. C. KIDWELL 2,149,777
ANATOMICAL INJECTOR AND ASPIRATOR
Filed Nov. 22, 1937 2 Sheets-Sheet 1

INVENTOR.
CLARENCE KIDWELL
BY Rippey & Cassidy
HIS ATTORNEYS.

March 7, 1939.　　　　C. KIDWELL　　　　2,149,777
ANATOMICAL INJECTOR AND ASPIRATOR
Filed Nov. 22, 1937　　　2 Sheets-Sheet 2
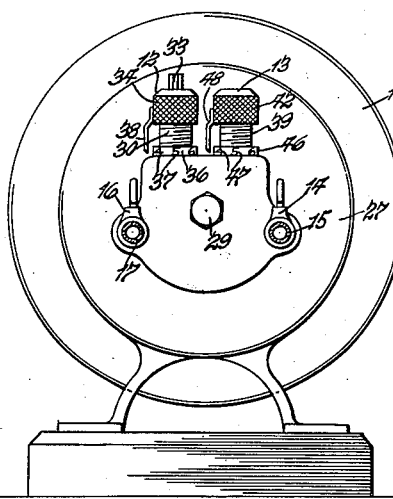
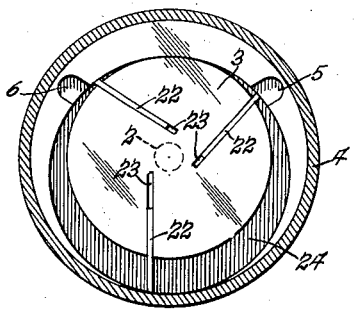
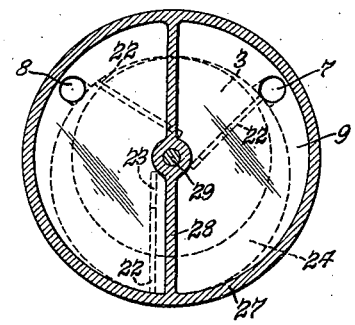
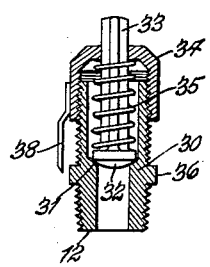
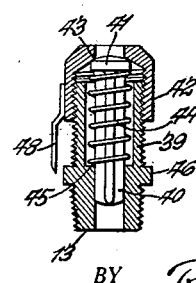
INVENTOR.
CLARENCE KIDWELL
BY Rippey & Cassidy
HIS ATTORNEYS.

Patented Mar. 7, 1939

2,149,777

UNITED STATES PATENT OFFICE 2,149,777

ANATOMICAL INJECTOR AND ASPIRATOR

Clarence Kidwell, St. Louis, Mo., assignor, by mesne assignments, to K-Z Company, St. Louis, Mo., a firm composed of Clarence Kidwell, Edwin J. Zeigenhein, and Arthur L. Locatell Application November 22, 1937, Serial No. 175,810

5 Claims. (Cl. 27—24)

This invention relates to injecting and aspirating apparatus for anatomical work and particularly adapted for use in embalming.

An object of this invention is to provide apparatus which will have a regulable source of air pressure and a regulable source of suction, both available for use at the same time in apparatus that is simple in construction, economical to manufacture, efficient in operation and durable in service.

Other objects will be apparent from the following detail description taken in connection with the accompanying drawings.

Fig. 3 is an end elevation of the device;

Fig. 4 is a cross section on line 4—4, Fig. 2;

Fig. 5 is a cross section on line 5—5, Fig. 2;

Fig 6 is a vertical section through a regulating valve for the pressure chamber; and Fig. 7 is a vertical section through a regulating valve in the suction or expansion chamber.

Figure 1:
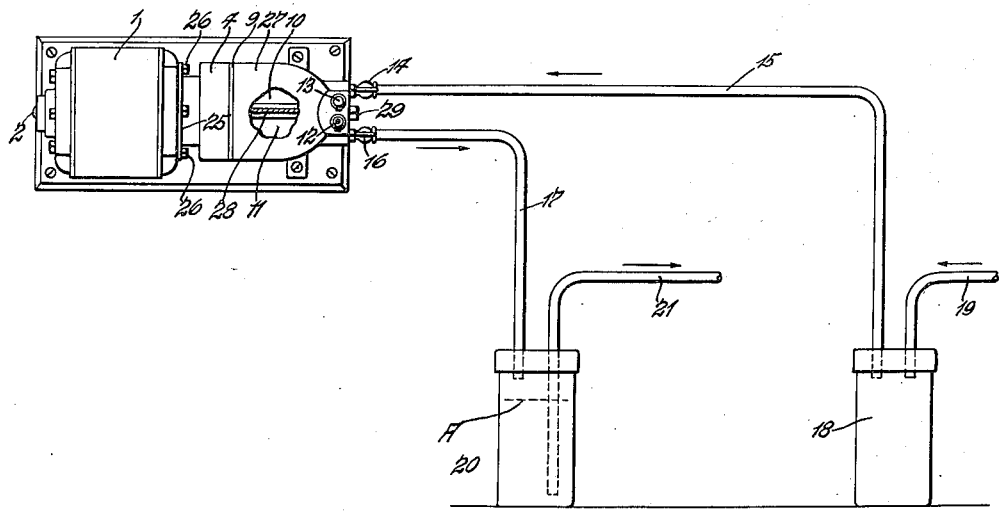
Fig. 1 is a diagrammatic view of apparatus embodying this invention.
Figure 2:
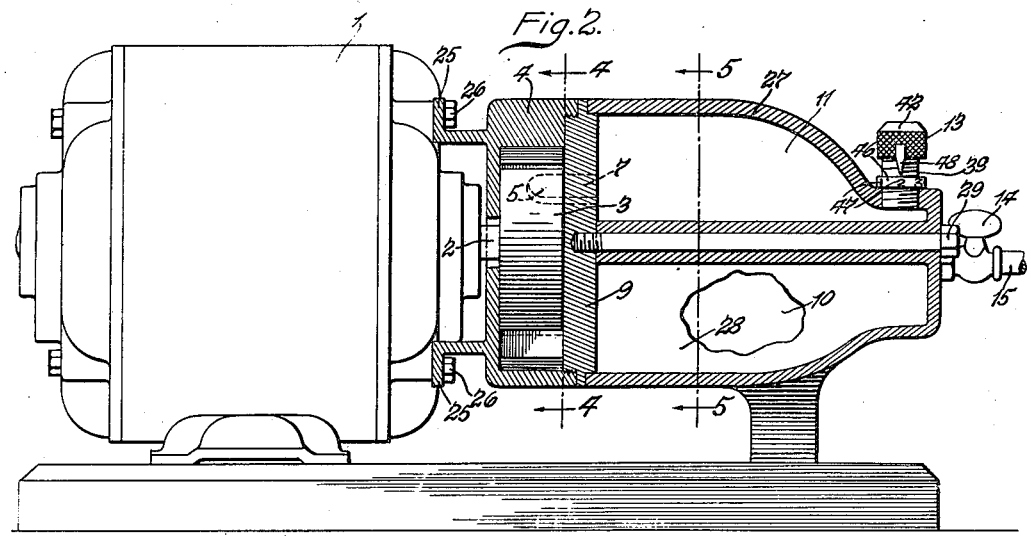
Fig. 2 is a plan view showing the pump and compartments in vertical section.

In the embodiment as specifically shown a motor 1 has its shaft 2 directly connected with a rotor 3 in a pump casing 4. The pump has an intake or suction port 5 and an exhaust or pressure port 6 connected by holes 7 and 8 respectively in a plate or wall 9 to a suction or expansion chamber or tank 10 and a pressure chamber or tank 11.

A regulable pressure release valve 12 is adapted to maintain a constant predetermined pressure in the chamber 11 during the operation of the apparatus by venting the chamber to atmosphere when predetermined pressure has been reached. A regulable valve 13, adapted to release at a predetermined sub-atmospheric pressure, is connected with the expansion chamber 10 to give a predetermined sub-atmospheric pressure.

A cock 14, to which a suction line 15 is connected, taps the expansion chamber 10 and a cock 16, to which a pressure line 17 is connected, taps the pressure chamber 11.

The line 15 is connected into the top of an aspirating or receiving vessel 18 to which is also attached an operating line 19. The operating line 19 may be attached to a trocar (not shown).

The pressure line 17 is attached to the top of a fluid reservoir 20 which has an operating line 21 extending toward the bottom. When the apparatus is used for injecting a liquid as it is intended to be, the liquid will be placed in the vessel 20, the level of which is shown by a broken line A.

The operation of the device may be understood from the foregoing description. When the motor is operated the rotor 3 is turned, causing a suction or sub-atmospheric pressure at the port 5 and a super-atmospheric pressure at the port 6, which are in communication directly with the expansion chamber 10 and the pressure chamber 11. The valves 12 and 13 can be adjusted independently to secure any desired sub-atmospheric pressure and super-atmospheric pressure respectively in the chambers. These pressures are communicated through the cocks 14 and 16 to the lines 15 and 17. Both of these pressures will be available at the same time and will be maintained substantially constant because the relatively large size of the expansion and pressure chambers prevents any pulsations that would result if the lines were connected directly to the pump ports. Suction is communicated through the vessel 18 to the line 19 and any liquids extracted are deposited in the vessel 18. Pressure is communicated to the top of the liquid at the level A in the vessel 20 and the liquid is forced under the predetermined pressure, as explained above, through the line 21. It will be apparent that the operator has at his command a constant predetermined pressure and suction at the same time, both of which can be regulated independently of each other to suit his purpose, and that such pressure and suction will not be appreciably affected by any pump pulsations.

Pressure from one to six pounds under and over atmosphere may be desired and available with the apparatus.

The motor may be of any convenient, suitable, selected structure. Single phase induction motors of one-fourth or one-eighth horsepower with a rating of 1750 R. P. M. has been found satisfactory.

The pump is of familiar type and has a pump casing 4 with a cylindrical opening eccentric to the motor shaft in which is eccentrically mounted a cylindrical rotor 3 having vanes 22 operating in slots 23. This arrangement leaves a crescent shaped pump chamber 24. The casing 4 is attached to the motor by means of a flange 25 through which extend motor bolts 26. The plate 9 acts as an end wall for the pump as well as an end wall for the chambers 10 and 11. The holes 7 and 8 through the plate register with the ports 5 and 6, hence the suction side of the pump is connected directly with the chamber 10 through the hole 7 and the port 6 is connected directly through the hole 8 with the chamber 11.

The chambers or tanks 10 and 11 are formed by a casing 27 together with the plate 9 and a partition 28 which may be cast conveniently with the casing 27. As shown the plate 9 is secured by threads to the casing 4 while the casing 27 and the partition 28 are held in abutting engagement with the plate 9 by a stud bolt 29.

The tanks 10 and 11 are each of a volume several times that of the pump chamber, and this prevents sudden fluctuations of pressure.

The regulating valve 12 for the pressure chamber 11 is shown in section in Fig. 6. It comprises a valve body 30 having a valve seat 31 on which is positioned a valve member having a head 32 and a non-circular stem 33. A cap 34 is threaded for adjustment on the top of the valve body 30 and a spring 35 is positioned between the head 32 and the bottom of the cap 34. It will be obvious that when the cap 34 is turned the tension on the spring 35 will be changed to regulate the pressure in the chamber 11. The valve body 30 has an annular outer surface 36 on which are placed calibrations 37. A pointer 38 secured to the cap 34 cooperates with the calibrations 37 on the ring 36 to indicate the pressure for which the valve is set.

The valve 13 is somewhat similar in construction to the valve 12 previously described, but designed as a regulating means for sub-atmospheric pressure; it includes a valve body 39, the lower part of which furnishes a guide for a valve stem 40, which carries a head 41 at its upper end. A cap 42 in threaded engagement with the upper part of the valve body 39 has a valve seat 43 for the head 41. A spring 44 is positioned between the head 41 and an annular chamber 45 in the interior of the valve body 39. The valve body has an interior annular surface 46 carrying calibrations 47 which cooperate with a pointer 48 on the cap 42. It will be obvious that by turning the cap 42 the tension of the spring 44 may be regulated to control the pressure at which the valve will release to vent the chamber to atmosphere, and thereby to maintain a regulable predetermined sub-atmospheric pressure in the expansion or suction chamber 10.

It should be apparent from the foregoing description that the invention accomplishes its objects. Apparatus has been provided which is simple in construction, economical to manufacture, efficient in operation and durable in service. The apparatus provides means for furnishing at the same time predetermined sub-atmospheric and super-atmospheric pressures, which may be regulated independently at the will of the operator.

The invention comprises the parts and their arrangement as specifically pointed out in the appended claims. Various changes may be made in the details of construction within the scope of those claims, without departing from the spirit of this invention, and parts of the invention may be used to advantage without the whole.

I claim:

1. In anatomical injecting and aspirating apparatus having a pump with a suction port and a pressure port, a receiving vessel, an injecting fluid reservoir, a line connecting the suction port with said vessel and a line connecting the pressure port with said reservoir, the improvement comprising an expansion chamber open to the first mentioned line, an automatic valve to regulate the pressure in the expansion chamber, a pressure chamber open to the second mentioned line, and a relief valve connected with the pressure chamber adapted to open at a predetermined pressure in the chamber.

2. In anatomical injecting and aspirating apparatus having a pump with a pump chamber, a suction port and a pressure port, a receiving vessel, an injecting fluid reservoir, a line connecting the suction port with said vessel and a line connecting the pressure port with said reservoir, the improvement comprising tanks each having a volume several times that of the pump chamber open respectively to said lines, and independent means for maintaining constant pressure in the tanks respectively.

3. In anatomical aspirating apparatus having a pump with a pump chamber and a suction port, a receiving vessel and a line connecting the suction port with the vessel, the improvement comprising an expansion tank open to the line with a volume several times that of the pump chamber, and an automatic valve to maintain constant sub-atmospheric pressure in the tank.

4. In anatomical injecting and aspirating apparatus including a pump having a casing with a cylindrical opening, a cylindrical rotor arranged eccentrically in said opening leaving a crescent shaped pump chamber said rotor having vanes constructed and arranged to secure a suction in one side of said chamber and to provide a pressure in the other side, a receiving vessel, a line connecting the receiving vessel with the suction side of said chamber, an injecting fluid reservoir, and a line connecting said reservoir with the pressure side of said chamber, the improvement comprising tanks connected to said lines respectively each having a volume several times that of the pump chamber, and independent means adjustable at will for maintaining constant pressure in the tanks respectively.

5. In anatomical injecting and aspirating apparatus having a pump with a suction port and a pressure port, a receiving vessel, an injecting fluid reservoir, a line connecting the suction port with said vessel and a line connecting the pressure port with said reservoir, the improvement comprising an expansion chamber open to the first mentioned line, a pressure chamber open to the second mentioned line, and adjustable valves connected and adapted to vent the chambers to atmosphere when predetermined pressures in the chambers are reached respectively.

CLARENCE KIDWELL.